US008055039B2

(12) United States Patent
Wu et al.

(10) Patent No.: US 8,055,039 B2
(45) Date of Patent: Nov. 8, 2011

(54) SYSTEM AND METHOD TO OBTAIN NOISE MITIGATED MONOCHROMATIC REPRESENTATION FOR VARYING ENERGY LEVEL

(75) Inventors: Xiaoye Wu, Rexford, NY (US); David Allen Langan, Clifton Park, NY (US); James Walter LeBlanc, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 931 days.

(21) Appl. No.: 12/035,072

(22) Filed: Feb. 21, 2008

(65) Prior Publication Data

US 2009/0214095 A1    Aug. 27, 2009

(51) Int. Cl.
 *G06K 9/00* (2006.01)
(52) U.S. Cl. .................................. 382/128; 382/275
(58) Field of Classification Search .............. 382/131, 382/132, 128, 275
See application file for complete search history.

(56) References Cited

U.S. PATENT DOCUMENTS

| | | | |
|---|---|---|---|
| 5,115,394 A * | 5/1992 | Walters ......................... | 382/131 |
| 5,461,655 A | 10/1995 | Vuylsteke et al. | |
| 5,682,036 A * | 10/1997 | Hines et al. .............. | 250/363.09 |
| 6,016,333 A | 1/2000 | Kalvin | |
| 6,197,278 B1 * | 3/2001 | Blankenberg et al. ........ | 424/1.69 |
| 6,737,652 B2 * | 5/2004 | Lanza et al. .............. | 250/363.06 |
| 6,909,459 B2 * | 6/2005 | Watson et al. .............. | 348/229.1 |
| 7,031,551 B2 | 4/2006 | Yano et al. | |
| 7,480,365 B1 * | 1/2009 | Topfer et al. .................. | 378/108 |
| 7,737,406 B2 * | 6/2010 | Vija et al. ................. | 250/363.04 |
| 2004/0101088 A1 * | 5/2004 | Sabol et al. ....................... | 378/4 |

OTHER PUBLICATIONS

Weinsaft et al., Diagnostic Impact of SPECT Image Display on Assessment of Obstructive Coronary Artery Disease, Sep.-Oct. 2007, Journal of Nuclear Cardiology, vol. 14, Issue 5, pp. 659-668.*
Hasegawa et al., Description of a Simultaneous Emission-Transmission CT System, 1990, SPIE: Medial Imaging IV: Image Formation, vol. 1231, pp. 50-60.*
Kalender et al., An Algorithm for Noise Suppression in Dual Energy CT Material Density Images, Sep. 1988, IEEE Transactions on MEdical Imaging, vol. 7, No. 3, pp. 218-224.*
Stenner et al., Automatic Exposure Control (AEC) for Dual Energy Computed Tomography (DECT), Oct. 26-Nov. 3, 2007, 2007 IEEE Nuclear Science Symposium Conference Record, pp. 4367-4372.*
Stenner et al., Empirical dual energy calibration (EDEC) for cone-beam computed tomography, Sep. 2007, Medical Physics, vol. 34, Issue 9, pp. 3630-3641.*
Kachelriess et al., Empirical Dual Energy Calibration (EDEC) for Cone-Beam Computed Tomography, Oct. 29-Nov. 1, 2006, 2006 IEEE Nuclear Science Symposium Conference Record, pp. 2546-2550.*

* cited by examiner

*Primary Examiner* — Matthew Bella
*Assistant Examiner* — Dennis Rosario
(74) *Attorney, Agent, or Firm* — Fletcher Yoder, P.C.

(57) ABSTRACT

In dual energy CT, through basis material decomposition (BMD), a pair of density images can be reconstructed. The noises in this image pair are negatively correlated due to the BMD process. A technique is presented for obtaining the monochromatic images at desired energy levels with reduced correlation noise. The technique includes obtaining a plurality of optimum attenuation coefficients for an energy level, selecting a desired energy level, obtaining a plurality of desired attenuation coefficients for the desired energy level, computing a scaling factor for a corresponding noise component based on the optimum attenuation coefficients and the desired attenuation coefficients, and generating a monochromatic image based upon the scaling factor.

18 Claims, 3 Drawing Sheets

SYSTEM AND METHOD TO OBTAIN NOISE MITIGATED MONOCHROMATIC REPRESENTATION FOR VARYING ENERGY LEVEL

BACKGROUND

The invention relates generally to diagnostic imaging and particularly, to a system and method of obtaining monochromatic representations of images at different energy levels.

Imaging systems such as general radiography X-ray system, tomosynthesis system, computed tomography (CT) system, mammography, positron emission tomography (PET) system, ultrasonic imaging, nuclear medicine imaging system and various other modalities are used to create images of a patient or object. These images are based on the attenuation of radiation passing through the object. Further, these imaging modalities may be used for contrast enhancement, volume reconstructions, two-dimensional image formation and so forth.

Typically, X-ray imaging systems for both medical and non-medical applications, utilize an X-ray tube to generate X-rays for the imaging process. In particular, conventional single rotating-anode X-ray tubes, which have single emission point that illuminates the entire field of view simultaneously, are typically employed as a source of X-rays in X-ray based imaging systems. Emitted X-rays pass through the object to expose the film, and the degree of exposure at the various points on the film are largely determined by the density of the object along the path of the X-rays. It is now common to utilize solid-state digital X-ray detectors (e.g., an array of switching elements and photo-sensitive elements such as photodiodes) in place of film detectors. The charges generated by the X-rays on the various points of the detector are read and processed to generate a digital image representative of attenuation of the object in electronic form, that are then transmitted to the data processing system for image reconstruction.

CT imaging system may include dual energy (DE), multi-energy (ME), and/or energy discriminating (ED) CT imaging system. Dual energy imaging in digital X-ray combines information from two sequential exposures at different energy levels. Multienergy imaging systems may have the energy spectra from different X-ray tube captured as a series of images in a rapid sequence. The EDCT, MECT, and/or DECT imaging system are examples configured to be responsive to different X-ray spectra. The detected signals from the spectrum of two regions of photon energy provide sufficient information to resolve the energy dependence of the material being imaged. However the images are processed to separate materials having varying atomic numbers and densities, using known methods.

In certain applications, for example dual energy X-ray or CT imaging system, the images acquired may have a similar CT number. CT number is defined as a quantitative scale for describing the relative transparency of the object to the passage of X-rays. During such instances, basis material decomposition (BMD) may be used for differentiating the material components in the images. However, it is noted that the images constructed through BMD techniques usually elevate noise component in the images.

BMD component combination technique is a method that has reduced noise components at a given energy range, where linearly weighted combination of the two BMD material images produces images in virtual monochromatic representation. Such monochromatic images can be reformed at any incident X-ray photon energy, for example from 10s to a few 100s of Kilo electron volt (keV). However, while using these reformed monochromatic images at lower keV or high keV, the noise components can be substantially high in these images.

Therefore, it is desirable to obtain monochromatic images from X-ray digital radiography systems or CT systems, at a wide range of energy levels and with reduced noise components.

BRIEF DESCRIPTION

In one aspect, the present technique provides a method for diagnostic imaging with minimized noise components in the monochromatic images. A method is provided to obtain noise cancellation in the monochromatic images across a broad energy range. The method provides for obtaining a plurality of optimum attenuation coefficients for an energy level, selecting a desired energy level, obtaining a plurality of desired attenuation coefficients for the desired energy level, computing a scaling factor for a corresponding noise component based on the optimum attenuation coefficients and the desired attenuation coefficients, and generating a second monochromatic image based upon the scaling factor.

In yet another aspect, the present invention diagnostic imaging system is provided that can be a computed tomography system, a dual energy computed tomography system, a multi energy computed tomography system, a positron emission tomography system or an energy discriminating system. The diagnostic imaging system includes a radiation source configured to emit a distinct spectrum of radiation towards an object, a detector configured to receive the distinct spectrum of radiation emitted by the source attenuated by the object, and a processor configured to compute a scaling factor for a corresponding noise component based on the energy attenuation coefficients, and generate a monochromatic image based upon the scaling factor. Systems and computer programs that afford such functionality may be provided by the present technique.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique is generally related to a method of generating monochromatic images at a wide range of energy levels. In general diagnostic devices comprise X-ray systems, magnetic resonance (MR) systems, computed tomography (CT) systems, positron emission tomography (PET) systems, ultrasound, nuclear medicine, and other types of imaging systems. Also the applications of X-ray sources extend to imaging, medical security and industrial inspection systems and its high penetration power could be extended to radiography, radiology, radiotherapy and scientific research. Moreover, the present technique is employable for the conversion of X-rays and provide contrast enhancement in the image representations. However, it will be appreciated by those skilled in the art that an implementation is employable for the conversion and contrast enhancement of other high electromagnetic energy as well.

The operating environment of the present technique is described with respect to a third generation CT scanner but is equally applicable with other CT systems. Moreover, the present discussion will be described with respect to the conversion of X-rays, contrast enhancement, and minimizing noise for various energy levels in the X-ray images. However, it will be appreciated by those skilled in the art that the present method may be applied or extended for use with other single slice or multi-slice configurations, dual energy or multi energy configurations and other CT systems.

Figure 1:
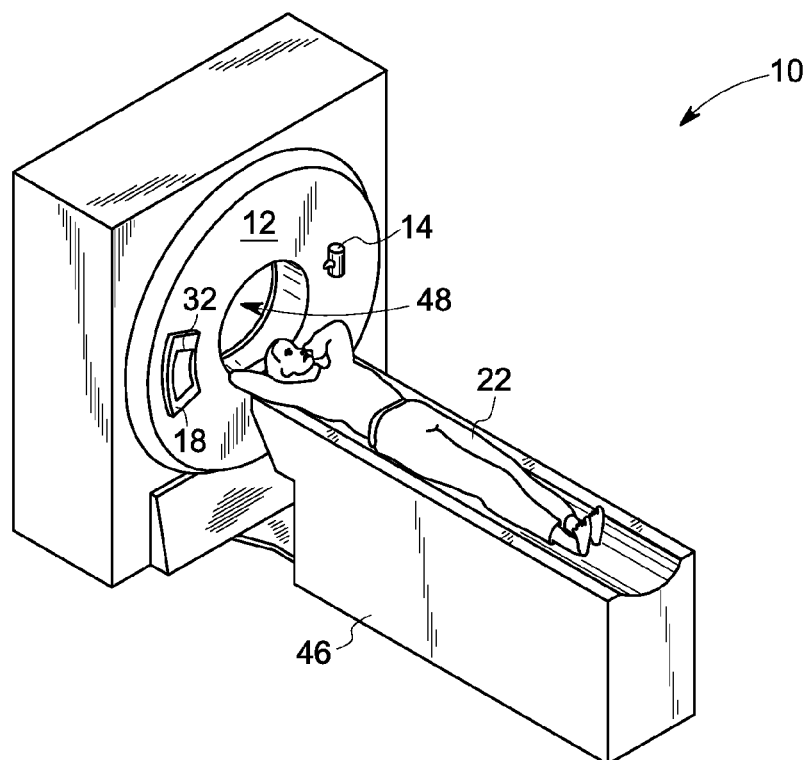
FIG. 1 is a pictorial view of a CT imaging system adapted for generating images in accordance with the present techniques.
Figure 2:
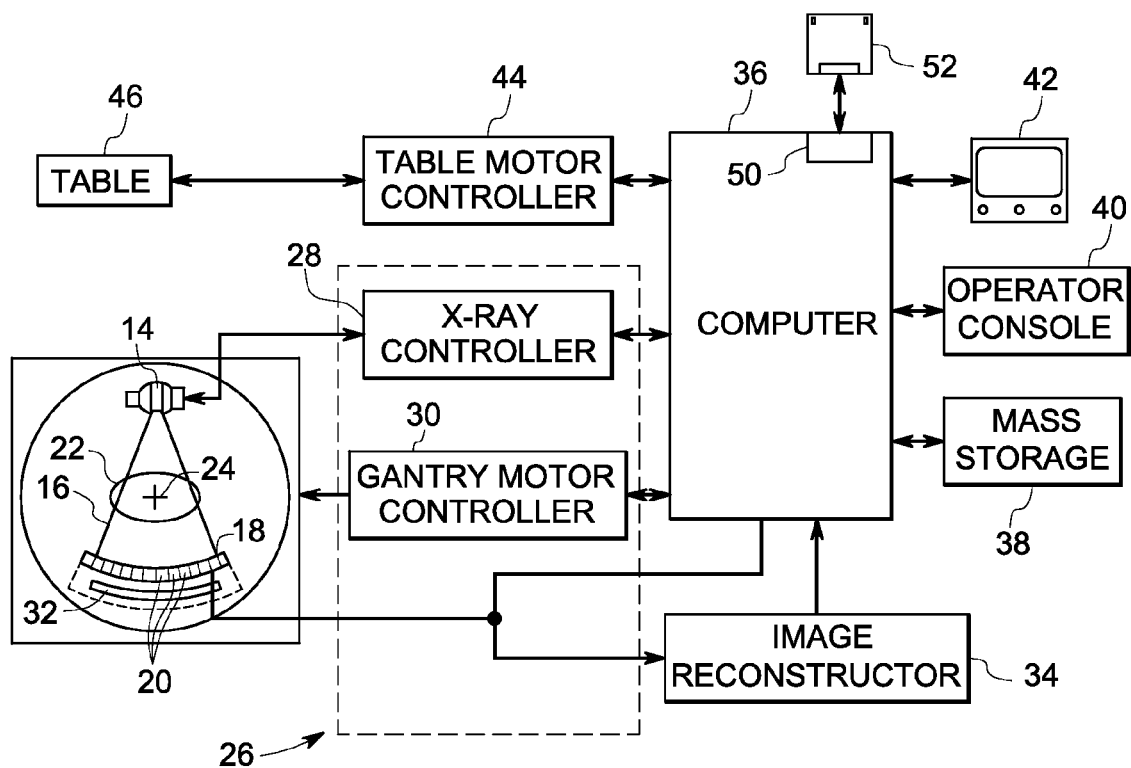
FIG. 2 is a schematic block diagram of the exemplary imaging system illustrated in FIG. 1.

Referring to FIG. 1, a CT imaging system 10 is shown as including a gantry 12 representative of a "third generation" CT scanner. Gantry 12 has a radiation source such as X-ray tube 14 (also called X-ray source 14 herein) that projects a spectrum of X-rays 16 toward a detector assembly or collimator 18 on the opposite side of the gantry 12. Referring now to FIG. 2, detector array 18 is formed by a plurality of detector rows (not shown) including a plurality of detector elements 20 and data acquisition systems (DAS) 32. The plurality of detector elements 20 together sense the spectrum of X-rays that pass through the patient 22 between assembly 18 and source 14. Each detector element 20 produces an analog electrical signal that represents the intensity of an impinging X-ray spectrum and hence can be used to estimate the attenuation of the spectrum as it passes through the patient 22. During a scan to acquire X-ray projection data, gantry 12 and the components mounted thereon rotate about a center of rotation 24.

As described above, each detector 20 may be designed to directly convert radiographic energy to electrical signals containing energy discriminator or photon direct count data. In a preferred embodiment, each detector 20 includes a semiconductor layer (not shown) fabricated to form direct conversion detectors. Each detector 20 also includes metalized anodes attached to a semiconductor layer. Further such detectors 20 may include an electrical circuit having multiple comparators thereon to reduce statistical error due to pileup of multiple energy events when the detector is operating in a photon counting mode.

In the embodiment illustrated in FIG. 1 and 2 the exemplary imaging system may acquire an image or slice of the patient or object which may incorporate in certain modes, less or more than 360 degrees of projection data to formulate an image. The image may be collimated to different dimensions using tungsten blades in front of the X-ray source and with different detector apertures. A collimator typically defines the size and shape of the spectrum of X-rays 16 that emerges from the X-ray source 14, and a bowtie filter may be included in the system 10 to further control the dose to the patient 22. A typical bowtie filter attenuates the spectrum of X-rays 16 to accommodate the body part being imaged, such that, in general, less attenuation is provided for X-rays passing through or near isocenter of the patient 22. The bowtie filter shapes the X-ray intensity during imaging in accordance with the region of interest, field of view, and/or target region of the patient.

Rotation of gantry 12 and the operation of X-ray source 14 are governed by a control mechanism 26 of CT system 10. Control mechanism 26 includes an X-ray controller 28 that provides power and timing signals to an X-ray source 14 and a gantry motor controller 30 that controls the rotational speed and position of gantry 12. An image reconstructor 34 receives sampled and digitized X-ray data from DAS 32 and performs high speed image reconstruction. The reconstructed image is applied as an input to a computer 36, which stores the image in a mass storage device 38. Image reconstructor 34 can be specialized hardware or computer program executing on computer 36. The associated mass storage device 38 may store programs and codes executed by the computer, configuration parameters or store programs or codes for implementing the present technique.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, X-ray controller 28 and gantry motor controller 30. In addition, computer 36 operates a table motor controller 44, which controls a motorized table 46 to position patient 22 and gantry 12. Particularly, table 46 moves patient 22 through a gantry opening 48 of FIG. 1 in whole or in part.

In one embodiment, computer 36 includes a device 50, for example, a floppy disk drive, CD-ROM drive, DVD drive, magnetic optical disk (MOD) device, or any other digital device including a network connecting device such as an Ethernet device for reading instructions and/or data from a computer readable medium 52, such as floppy disk, a CD-ROM, a DVD, a MOD or an other digital source such as a network or the internet, as well as yet to be developed digital means. It should be understood that such of those computer accessible memory device is capable of storing the desired amount of data and/or code utilized by an exemplary system 10. In another embodiment, computer 36 executes instructions stored in firmware (not shown). Computer 36 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits (ASICs), and other programmable integrated circuits, and these terms are used interchangeably herein.

Alternatively some configurations of the present embodiment use dual energy computed tomography (DECT) for imaging the patient or object. Two scans, each using distinct X-ray spectra with polychromatic photons or photons having different energies and covering the same anatomy, can be performed in series and this method can be implemented on the standard CT system without requiring modification. Another method in multi energy computed tomography (MECT) system is to detect photon energy according to the penetration depth at the detector. Also acquiring MECT data involves sequentially changing the energy spectrum between the higher and lower energies during a scan. Another embodiment of the invention utilizes sequentially changing the output of the high voltage supply that powers the X-ray tube 14 to obtain Kilovoltage Peak (kVp) modulation. Such of these DECT, MECT, energy discriminating computed Tomography (EDCT) modalities could be used through any suitable means for the acquisition of the data and for measurement of X-ray attenuation at two or more energy levels or bins. The data acquired are calibrated to represent line integrals of the attenuation coefficients of the scanned object or the patient 22 and the processed data are called projections. As will be appreciated by those skilled in the art that the projection data for different energy spectra could be obtained not only through kVp switching but also through other methods.

Figure 3:
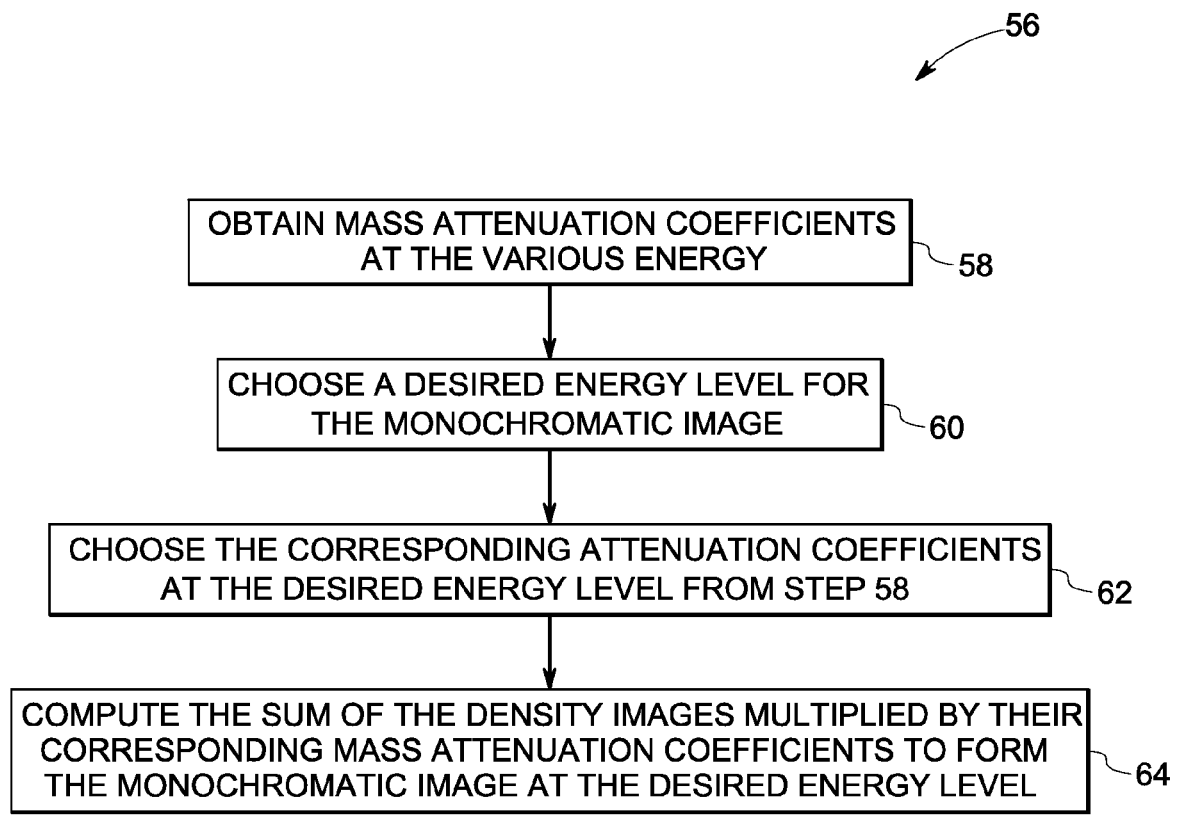
FIG. 3 is a control logic representing generation of monochromatic image for the desired energy spectra in accordance with aspects of the present techniques.

For example referring now to FIG. 3 the exemplary control logic 56 for generating monochromatic image for the desired energy spectra in accordance with one aspect of the present technique. As illustrated the control logic acquires the projection data via an imaging system such as in FIG. 1. At step 58 the plurality of attenuation coefficients for the two basis materials at various energy levels is obtained from existing mass attenuation coefficients database. Upon choosing the desired energy level in step 60, the attenuation coefficients for the desired energy level is obtained at step 62. The monochromatic image representation at the desired energy level is computed as the sum of the two basis material density images multiplied by their corresponding attenuation coefficients at the desired level, as illustrated in step 64.

In an exemplary embodiment, the method uses decomposition algorithm, such as, but not limited to a CT number difference algorithm, a Compton and photoelectric decomposition algorithm and a basis material decomposition algorithm. Accordingly through BMD the one or more projection data generate the material component projection pair. The material component projection pair represents the respective density integration of the same object and upon reconstruction forms the material density images Im1 and Im2. Moreover the basis materials represented may be such as soft tissue and bone, soft tissue and iodine.

Figure 4:
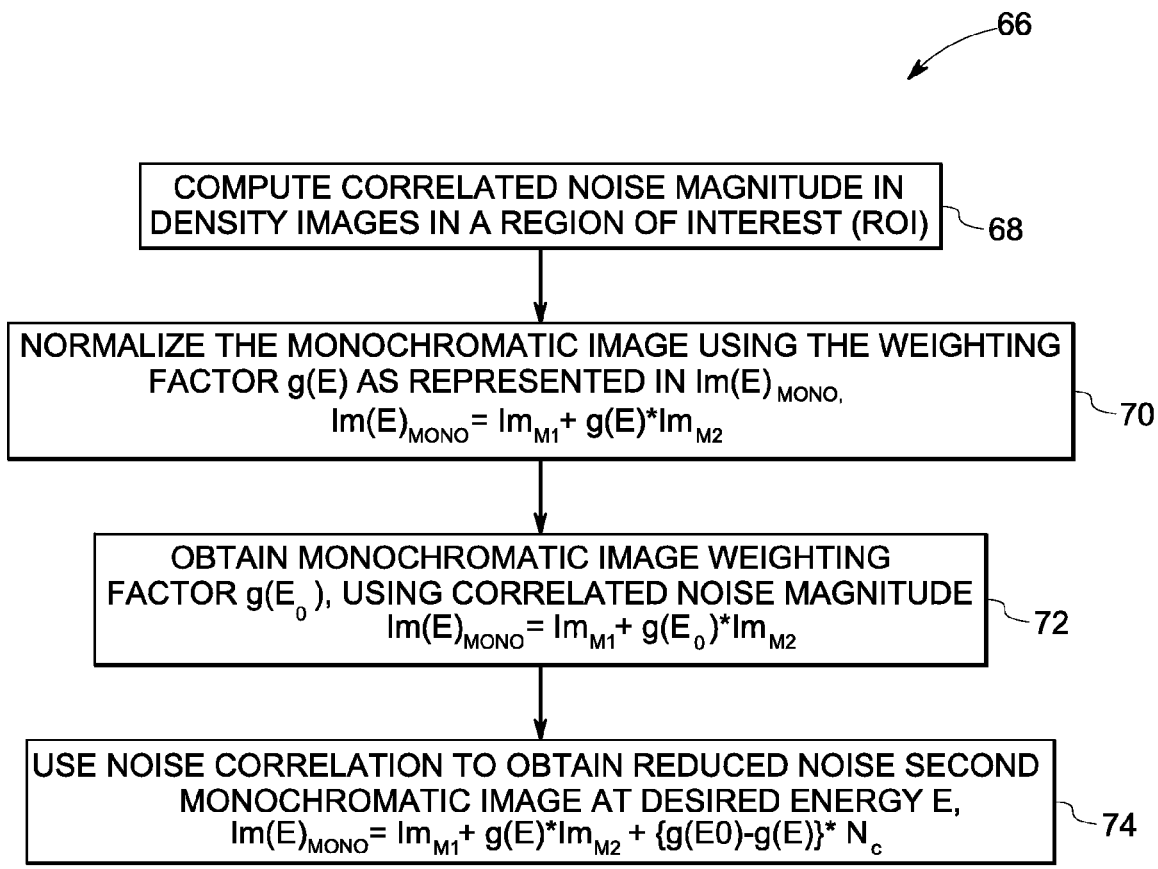
FIG. 4 is a schematic block diagram of a technique for generating a monochromatic image with minimum noise more elaborately in accordance with an exemplary embodiment of the present technique.

In one implementation of the present technique and referring to FIG. 4, the monochromatic image with the minimum noise is obtained in accordance with an exemplary embodiment and each step is described in further detail as shown below. Accordingly, the monochromatic representation of an image at photon energy E can generally be formed as, $$Im(E)_{mono}=u(E)_{m1}*Im_{m1}+u(E)_{m2}*Im_{m2} \quad \text{(Equation. 1)}$$

where, $u(E)_{m1}$, $u(E)_{m2}$ are the mass attenuation coefficients of basis material m1 and m2, respectively. $Im_{m1}$ and $Im_{m2}$ are the density images of the two basis materials respectively. $Im(E)_{mono}$ is the monochromatic image at energy E.

Further in step 68, the correlated noise magnitude in the density images are computed in a region of interest and the monochromatic image is normalized to maintain the constant value for one basis material, such as water or soft tissue for viewing purposes. Hence the monochromatic image is scaled or normalized using the weighting factor g(E), and is represented as, $$Im(E)_{mono}=Im_{m1}+g(E)*Im_{m2}, \quad \text{(Equation. 2)}$$

where, $g(E)=u(E)_{m2}/u(E)_{m1}$

In the relations defined above, if the noises in the density images or the image pair are negatively correlated due to the BMD process, the monochromatic image could be obtained with reduced noise at various energy levels. So in one implementation an optimum energy level ($E_0$) is obtained at which a monochromatic image has least noise. Furthermore, assuming that the negatively correlated noise magnitudes in images $Im_{m1}$ and $Im_{m2}$ are $\Delta_1$ and $\Delta_2$, respectively, the image Im(E)$_{mono}$ has minimum noise components when, $g(E_0)=\Delta_1/\Delta_2$, at corresponding photon energy $E_0$, resulting in a monochromatic image, $$Im(E_0)_{mono}=Im_{m1}+g(E_0)*Im_{m2}, \quad \text{(Equation. 3)}$$

where, the correlated image noise magnitudes $\Delta_1$, $\Delta_2$ are obtained using the averaged projection quantum noise in a region of interest (ROI) and the BMD decomposition functions.

As in step 70, if the monochromatic image is represented at a desired energy E, the corresponding image is represented by equation (2), where the image noise is observed to be higher than the image noise represented in equation (3). In order to fully cancel the correlated noise in the density images $Im_{m1}$ and $Im_{m2}$, a proper portion of the image noise in one of the density images has to be added to equation (2) as follows. Based on the above relationship this is achieved by choosing any one of the material density images and computing a noise mask for the noise component in selected image. As would be appreciated by those skilled in the art that the noise mask from the images could be obtained by performing a denoise algorithm. Hence the processor is capable of computing the noise mask from one of the image and the scaled noise component could represent the high frequency component of one of the material decomposed image. Further the noise in the selected image (for example $Im_{m2}$) is first extracted using a high-pass filter, resulting in a correlated noise mask ($N_c$). Using the scaled noise component, full correlation noise cancellation is obtained at energy E, resulting in a monochromatic image represented as, $$Im(E)_{mono}=Im_{m1}+g(E)*Im_{m2}+\{g(E0)-g(E)\}*N_c, \quad \text{(Equation. 4)}$$

In general, noise may be considered as a factor for deciding the CT image quality that is dependent upon balancing of the relative parameters.

As illustrated above, the exemplary imaging system 10 or other processor based diagnostic imaging system may obtain the projection data for the energy spectra, reconstruct the basis material images, obtain an optimum energy level at which a monochromatic image has least noise, select a desired energy level compute the scaling factor based on a plurality of optimum energy attenuation coefficients and the plurality of desired energy attenuation coefficients and generate a monochromatic image for the desired energy level for evaluation or diagnosis. As indicated above through EDCT/MECT/DECT, the projection data for two or more distinct set of incident X-ray spectra are typically obtained for imaged object at different peak kVp levels or alternatively, at a single tube peak kVp level with an energy sensitive detectors of the detector array.

Typically, the method is provided to obtain the maximum noise cancellation in the monochromatic images across a broad energy range. The BMD process generates two new projections based on the measured projections at the two-kVp X-ray spectra. The new projections often represent the density integration of the two basis materials along the original ray path. On reconstruction using the new CT projections produces density images of the two basis materials. In addition, weighting with known mass attenuation coefficients of the basis material at an X-ray photon energy, the monochromatic representation of the image at that energy can be formed. This weighted combination cancels the negatively correlated noise components in the BMD density images, resulting in a reduced noise image. The amount of noise cancellation depends on the scaling factor and hence, the X-ray photon energy.

As will be appreciated by those skilled in the art, the techniques described in various embodiments discussed above provide monochromatic representation with reduced noise and render good contrast in an automated fashion thereby improving the diagnostic capability of radiologists or physician. Further monochromatic image representations may be used in interventional vascular applications with improved contrast lead to better visibility and extends the maximum penetration limit. Additionally the image quality improvement at lower energy level could be used for contrast boosting and high keV for attenuation correction in some systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for diagnostic imaging comprising:
    obtaining a plurality of attenuation coefficients at an energy level based on at least two basis material images and at which a monochromatic image generated based upon the plurality of attenuation coefficients has least noise;
    selecting an energy level;
    obtaining a plurality of desired attenuation coefficients at the selected energy level;
    computing a corresponding noise component scaling factor based on the attenuation coefficients and the desired attenuation coefficients;
    generating a second monochromatic image at the selected energy level based upon the scaling factor; and
    adding a scaled noise component to the second monochromatic image canceling correlated noise in the second monochromatic image.

2. The method of claim 1, wherein the plurality of attenuation coefficients at the energy level is defined based on a region of interest.

3. The method of claim 1, wherein the corresponding noise component is a noise mask obtained from at least one of a material density images.

4. The method of claim 3, further comprising applying a basis material decomposition technique to obtain the material density images.

5. The method of claim 1, further comprising computing the scaling factor of the scaled noise component at the selected energy level.

6. The method of claim 5, wherein the scaled noise component is for a high frequency component of the image.

7. The method of claim 6, further comprising generating the second monochromatic image by applying a noise mask for the scaled noise component at the selected energy level.

8. A diagnostic imaging system comprising:
    a radiation source configured to emit a distinct spectrum of radiation towards an object;
    a detector configured to receive the distinct spectrum of radiation emitted by the source attenuated by the object; and
    a processor configured to:
        obtain a plurality of attenuation coefficients at an energy level based on at least two basis material images and at which a monochromatic image generated based upon the plurality of attenuation coefficients has least noise;
        select an energy level to obtain a plurality of desired attenuation coefficients;
        compute a corresponding noise component scaling factor based on the energy attenuation coefficients and the desired energy attenuation coefficients;
        generate a second monochromatic image at the selected energy level based upon the scaling factor; and
        add a scaled noise component to the second monochromatic image canceling correlated noise in the second monochromatic image.

9. The imaging system of claim 8, further comprising a data acquisition system operably coupled to the detector and configured to process data collected by the detector based upon the received energy.

10. The imaging system of claim 8, wherein the processor is further configured to access a projection data for at least two distinct spectrum of radiation.

11. The imaging system of claim 10, wherein the projection data is acquired by at least one of a computed tomography system, a dual energy computed tomography system, a multi energy computed tomography system, a positron emission tomography system or an energy discriminating system.

12. The imaging system of claim 10, wherein the processor is further configured to reconstruct the projection data applying a material decomposition technique.

13. The imaging system of claim 8, wherein the processor is further configured to compute the scaling factor of the scaled noise component at the selected energy level.

14. The imaging system of claim 13, wherein the processor is further configured to generate the second monochromatic image by applying a noise mask for the scaled noise component at the selected energy level.

15. The image analysis system of claim 14, wherein the processor is further configured to store and display the second monochromatic image for diagnosis.

16. A non-transitory computer readable media, comprising:
    code adapted to obtain a plurality of attenuation coefficients at an energy level based on at least two basis material images and at which a monochromatic image generated based upon the plurality of attenuation coefficients has least noise;
    code adapted to select an energy level;
    code adapted to obtain a plurality of desired attenuation coefficients at the selected energy level;
    code adapted to compute a corresponding noise component scaling factor based on the energy attenuation coefficients and the desired energy attenuation coefficients;
    code adapted to generate a second monochromatic image based upon the scaling factor; and
    code adapted to add a scaled noise component to the second monochromatic image canceling correlated noise in the second monochromatic image.

17. The computer readable media of claim 16, wherein code adapted to compute the corresponding noise component is a noise mask obtained from at least one of a material density images.

18. The computer readable media of claim 17, further comprising code adapted to generate the second monochromatic image by applying a noise mask for the scaled noise component at the selected energy level.

* * * * *